United States Patent [19]

Tsuda

[11] 4,394,415
[45] Jul. 19, 1983

[54] ELECTROMAGNETIC WAVE ENERGY ABSORBING MATERIAL

[76] Inventor: Shunji Tsuda, 12-12-604 Nishi-kamata, 7-chome, Ota-ku, Tokyo, Japan

[21] Appl. No.: 390,192

[22] Filed: Jun. 21, 1982

[30] Foreign Application Priority Data

Aug. 5, 1981 [JP] Japan .............................. 56-122711

[51] Int. Cl.$^3$ ....................... B32B 15/04; B32B 15/20; B32B 7/02
[52] U.S. Cl. ..................................... 428/332; 428/469
[58] Field of Search .............. 428/304.4, 306.6, 307.3, 428/307.7, 312.6, 312.8, 317.9, 320.2, 332, 469

[56] References Cited

U.S. PATENT DOCUMENTS 2,762,724  9/1956  Brennan ........................... 428/307.7
3,492,148  1/1970  Hervert ............................ 428/312.8
4,184,885  1/1980  Paace et al. ...................... 428/312.8

*Primary Examiner*—William J. Van Balen
*Attorney, Agent, or Firm*—Michael A. Painter

[57] ABSTRACT

An electromagnetic wave energy absorbing material for use in a solar energy industry, which absorbs effectively the energy of an electromagnetic wave such as the sunlight, is disclosed. This energy absorbing material comprises an aluminum material such as an aluminum simple substance and an aluminum alloy having a microporous aluminum oxide layer having a thickness of 0.1–1.4 μm on its surface, and 0.05–1.5 g/m$^2$ of at least one of elements selected from the group consisting of cobalt, silver, lead, molybdenum, copper, chromium, selenium, silicon, germanium, iron, manganese, nickel, zinc, tin and palladium is deposited in the micropores of the microporous aluminum layer.

4 Claims, 18 Drawing Figures

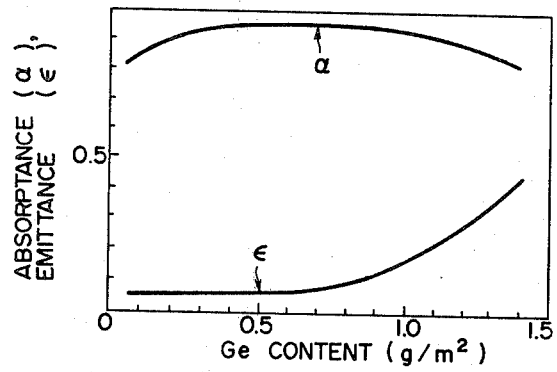
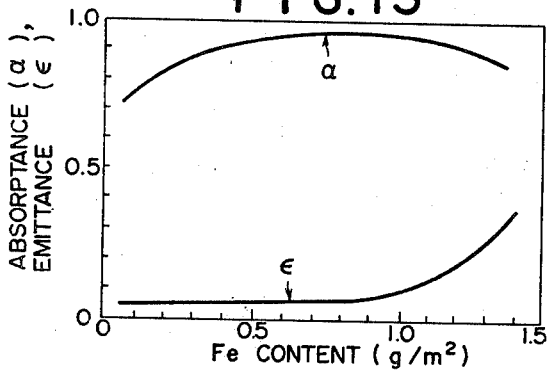
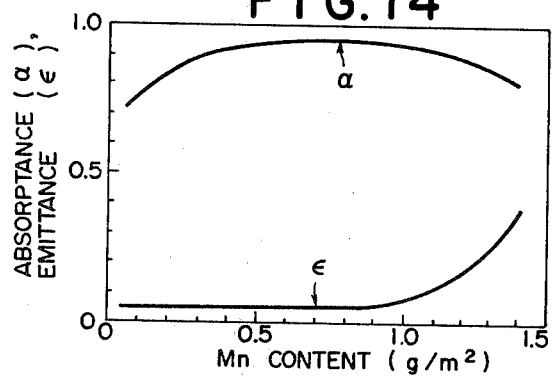
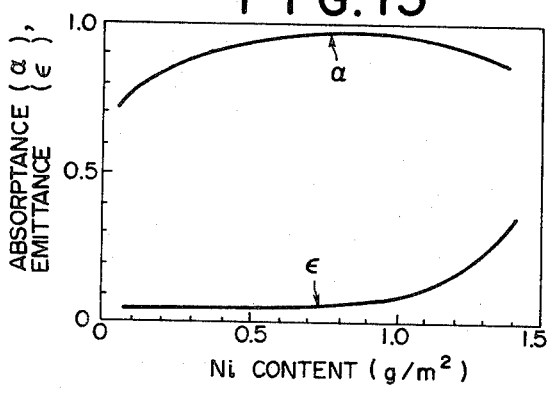
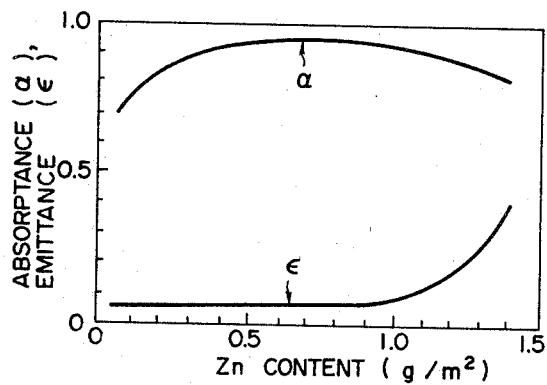
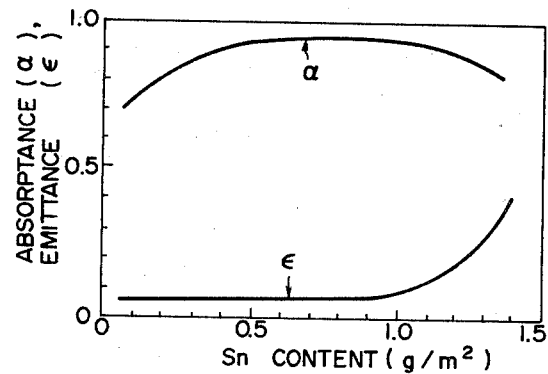
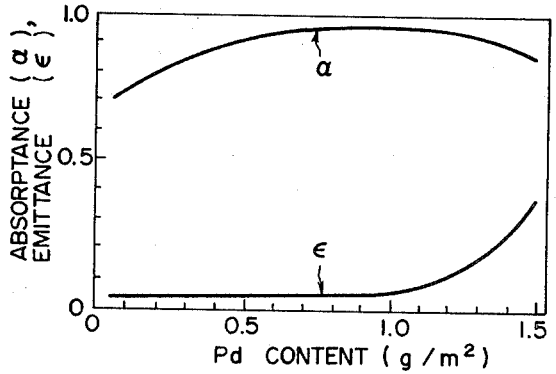

ELECTROMAGNETIC WAVE ENERGY ABSORBING MATERIAL

BACKGROUND OF THE INVENTION

The present invention relates to an electromagnetic wave energy absorbing material which effectively absorbs and accumulates the energy of the electromagnetic wave such as the sunlight, or the like, as a heat energy therein, for use in a solar energy industry.

In the prior art, a black paint is used for a solar collector and is coated over the surface thereof. However, in this case, the efficiency of the solar collector is not very good, and accordingly another material has been expected.

The characteristics of an electromagnetic wave energy absorbing material to be obtained according to the present invention are as follows.

(1) The very large absorptance $\alpha$ against a wavelength range (0.3–2.0 μm of the sunlight) of the electromagnetic wave to be absorbed, and (2) The very small emittance $\epsilon$ against a wider wavelength range (3–50 μm at 100° C.) than that of the electromagnetic wave, in order to minimize the emission loss of the heat energy absorbed.

The relation among the maximum stagnation temperature $T_{max}$, the absorptance $\alpha$, and the emittance $\epsilon$ of the electromagnetic wave energy absorbing material is expressed in the following formula.

$$T_{max} \approx \left(\frac{\alpha}{\epsilon} \cdot \frac{S}{\sigma}\right)^{\frac{1}{4}} \quad (1)$$

In this formula (1), a $\sigma$ means the Stefan-Bolzmann constant and S means an electromagnetic wave energy density. From this formula (1), it is readily understood that, in order to raise the maximum stagnation temperature of the electromagnetic wave energy absorbing material, the absorptance is increased and the emittance is reduced.

In FIG. 1 there is shown a graph showing an absorptance $\alpha$ with reference to an energy absorption efficiency parameter $\alpha/\epsilon$ and the maximum stagnation temperature $T_{max}$ of a conventional plane solar collector having a piece of transparent glass.

In FIG. 1, in case of the electromagnetic wave energy absorbing material having the absorptance $\alpha$ of 1.0, when the emittance $\epsilon$ is 1.0, i.e. $\alpha/\epsilon=1$, the maximum stagnation temperature is 120° C., and when the emittance $\epsilon$ is 0.1, i.e. $\alpha/\epsilon=10$, the maximum stagnation temperature is 225° C. Its temperature rising rate is approximately 88%. The very large absorptance and the very small emittance are essential to the electromagnetic wave energy absorbing material, as described above.

SUMMARY OF THE INVENTION

It is an object of the present invention to provide an electromagnetic wave energy absorbing material free from the aforementioned inconvenience, which is very effective and economical.

According to the present invention there is provided an electromagnetic wave energy absorbing material comprising an aluminum material having a microporous aluminum oxide layer having a thickness of 0.1–1.4 micron on its surface, wherein 0.05–1.5 g/m² of at least one of elements of metals and semiconductors selected from the group consisting of cobalt, silver, lead, molybdenum, copper, chromium, selenium, silicon, germanium, iron, manganese, nickel, zinc, tin and palladium is deposited in the micropores of the microporous aluminum oxide layer.

BRIEF DESCRIPTION OF DRAWINGS

In order that the present invention may be better understood, preferred embodiments thereof will be described with reference to the accompanying drawings, in which:

FIGS. 5–18 are graphs, alike FIG. 4, showing absorptances and emittances with reference to contents of silver, lead, molybdenum, copper, chromium, selenium, silicon, germanium, iron, manganese, nickel, zonc, tin and palladium, respectively, which are deposited in the micropores of the aluminum oxide microporous layer of an absorbing material according to the present invention.

DESCRIPTION OF THE PREFERRED EMBODIMENTS

According to the present invention an aluminum material comprising an aluminum simple substance or an aluminum alloy is used for a base material. The aluminum material has the advantages such as the large thermal conductivity, the light weight, the good mechanical processing, the lower cost, and so forth.

Then, the aluminum material is processed by an anodic oxidation or anodizing in order to produce aluminum oxide micropores on its surface as follows.

An aluminum alloy 6063 was oxidized with direct or alternating current in a bath of an aqueous solution containing 5–15% by weight of phosphoric acid at room temperature for 5–10 minutes. Thus the obtained micropores are preferably open in the direction perpendicular to the aluminum alloy substrate surface.

Figure 1:
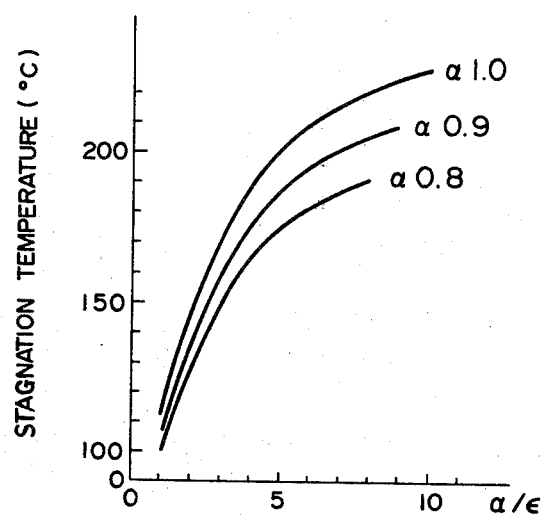
FIG. 1 is a graph showing an absorptance $\alpha$ with reference to an energy absorption efficiency parameter $\alpha/\epsilon$ and the maximum stagnation temperature $T_{max}$ of a conventional plane solar collector having a piece of transparent glass, wherein $\epsilon$ means an emittance.
Figure 2:
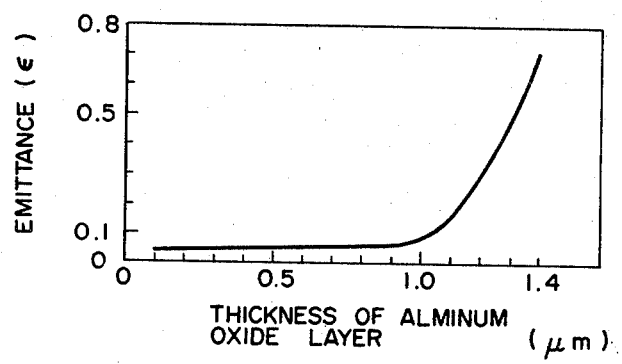
FIG. 2 is a graph showing an emittance $\epsilon$ with reference to a thickness of an aluminum oxide microporous layer of an absorbing material according to the present invention.

Then, the anodized aluminum alloy was carefully rinsed in water until the washings became neutral. The thickness of the anodized aluminum oxide microporous layer was measured by the multiple-beam interference method (MBI method), and its emittance $\epsilon$ is measured by an $\epsilon$ meter of an emission meter to obtain the results as shown in FIG. 2. From FIG. 2 it is readily understood that the proper thickness range of the aluminum oxide microporous layer is 0.1–1.4 μm, and is more preferably 0.1–0.9 μm.

Then, cobalt is deposited in the micropores of the aluminum oxide microporous layer by anodizing as follows.

The anodized aluminum alloy and a carbon electrode were connected to an electric source of direct or alternating current in a bath containing 2–10% by weight of cobalt acetate and 1–3% by weight of boric acid at room temperature for 3–9 minutes at a potential of 8–15 volts, to obtain an electromagnetic wave energy absorbing material. The obtained cobalt deposited aluminum alloy may be sealed in boiling water, as occasion demands, in a conventional manner.

Figure 3:
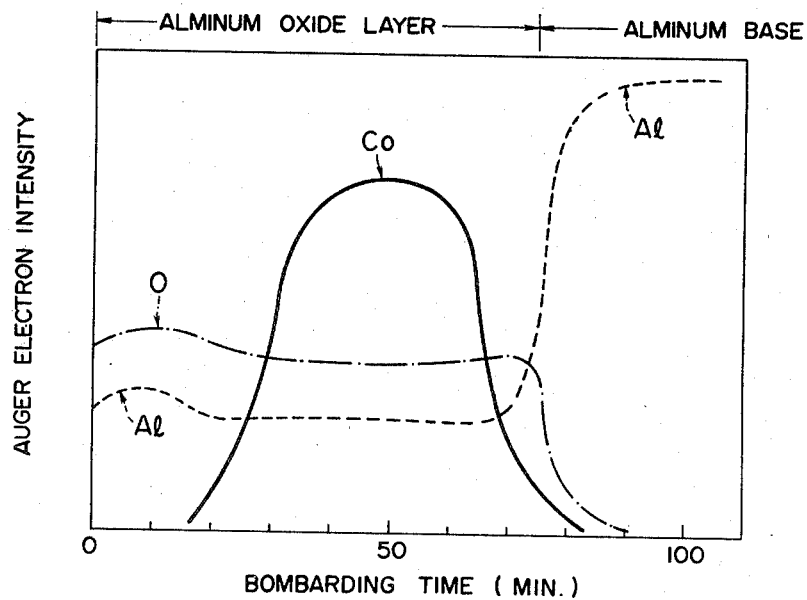
FIG. 3 is a graph showing distributions of the elements, cobalt, oxygen and aluminum of a cross-section of the aluminum oxide microporous layer of an absorbing material of the present invention according to the Auger Electron Spectroscopic Analysis.

The distributions of the elements of the cross-section of the aluminum oxide microporous layer of the absorbing material of the present invention are obtained according to the Auger electrom spectroscopic analysis, as shown by arbitrary unit in FIG. 3. The aluminum oxide layer of the absorbing material, having a plurality of micropores extending to the direction perpendicular to its surface possesses a thickness of approximately 0.48 $\mu$m.

From FIG. 3 it is understood that cobalt is deposited or contained in the micropores of the aluminum oxide layer of the absorbing material of the present invention.

Then, in order to measure the amount ($g/m^2$) of cobalt deposited or contained in the micropores of the absorbing material, the absorbing material having a surface area of 1 $m^2$ is immersed in a dilute nitric acid solution to dissolve the cobalt, and then the solution is analyzed by the atomic absorption analysis. Meanwhile, the absorptance $\alpha$ and emittance $\epsilon$ are measured by an $\alpha$ meter and the $\epsilon$ meter, respectively, as shown in FIG. 4.

Figure 4:
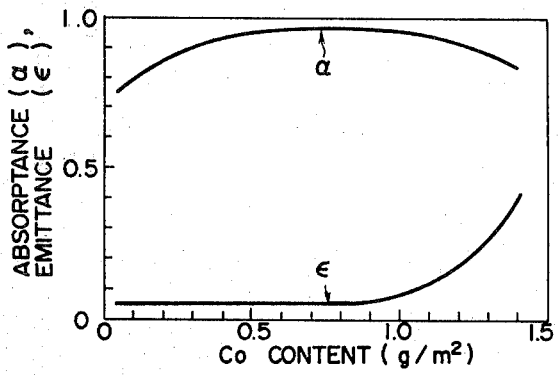
FIG. 4 is a graph showing an absorptance $\alpha$ and an emittance $\epsilon$ with reference to a content of cobalt deposited in the micropores of the aluminum oxide microporous layer of an absorbing material according to the present invention.
Figure 8:
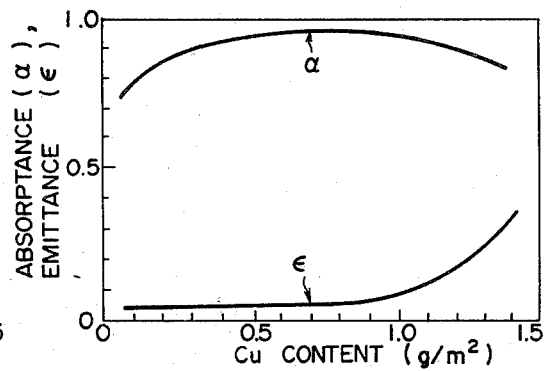
Figure 5:
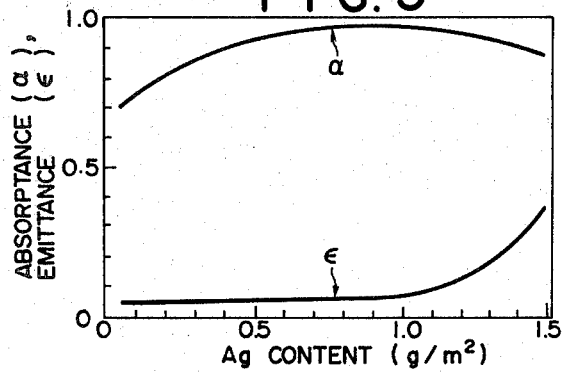
Figure 9:
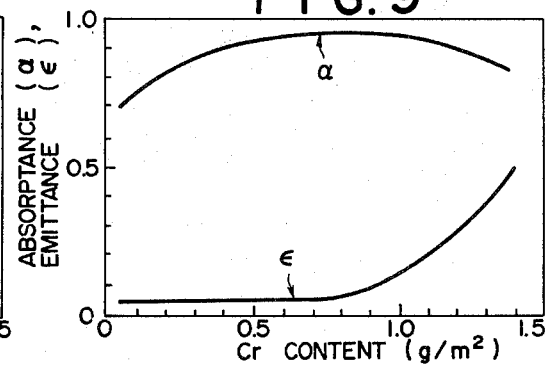
Figure 6:
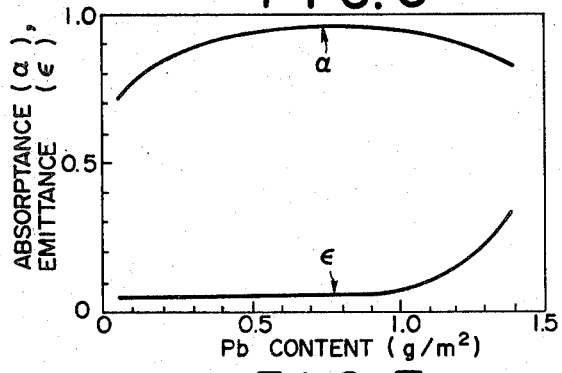
Figure 10:
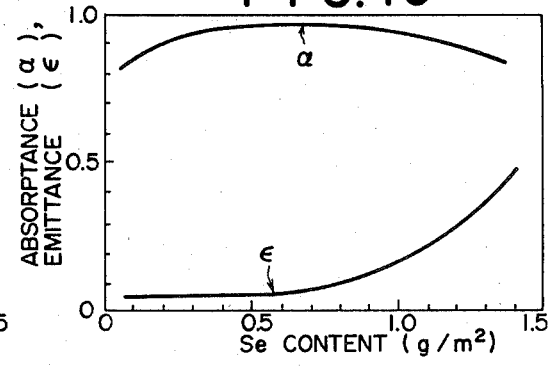
Figure 7:
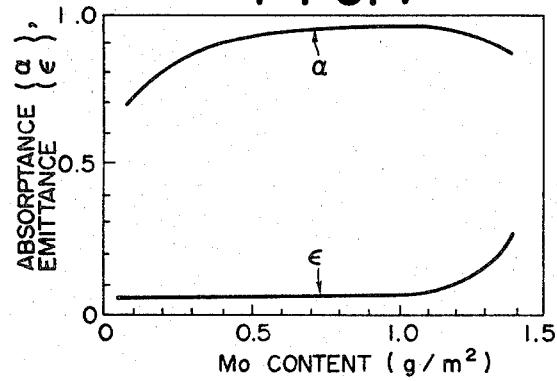
Figure 11:
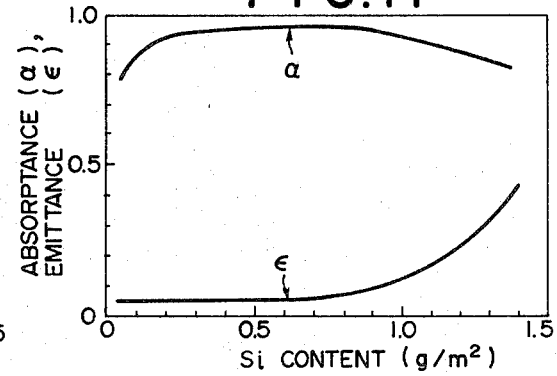

From FIG. 4 it is readily understood that, when the containing amount of cobalt of the absorbing material is 0.61 $g/m^2$, the absorptance $\alpha$, the emittance $\epsilon$ and $\alpha/\epsilon$ are 0.96, 0.04 and 24, respectively. Therefore, this absorbing material of the present invention can possess the desired characters as an electromagnetic wave energy absorbing material.

Then, silver, lead, molybdenum, copper, chromium, selenium, silicon, germanium, iron, manganese, nickel, zinc, tin or palladium is deposited in the micropores of the aluminum oxide microporous layer of the anodized aluminum alloy in the similar manner to the above described embodiment. The absorptances $\alpha$ and the emittances $\epsilon$ of these embodiments, which are obtained in the similar manner to the above embodiment, are shown in FIGS. 5–18.

From FIGS. 4–18 it is clear that the most proper containing amount range of one of elements selected from the group consisting of cobalt, silver, lead, molybdenum, copper, chromium, selenium, silicon, germanium, iron, manganese, nickel, zinc, tin and palladium is 0.05–1.5 $g/m^2$. Further, it will, of course, be understood that the most proper containing amount range of a plurality of elements selected from the group consisting of cobalt, silver, lead, molybdenum, copper, chromium, selenium, silicon, germanium, iron manganese, nickel zinc, tin and palladium is 0.05–1.5 $g/m^2$.

Further, according to the present invention, the electromagnetic wave energy absorbing material can be produced by sputtering a cermet such as $Ag—Al_2O_3$ with the aluminum alloy substrate.

In order to raise the durability of the electromagnetic wave energy absorbing material of the present invention, a heat-resistant high polymer may be coated over the surface of absorbing material.

Although the present invention has been described in some detail by way of illustration and examples for purposes of clarity of understanding, it will, of course, be understood that various changes and modifications thereof may be made in the form, details, and arrangement of the parts without departing from the scope of the present invention.

What is claimed is:

1. An electromagnetic wave energy absorbing material comprising an aluminum material having a microporous aluminum oxide layer having a thickness of 0.1–1.4 micron on its surface, wherein 0.05–1.5 $g/m^2$ of at least one of elements of metals and semiconductors selected from the group consisting of cobalt, silver, lead, molybdenum, copper, chromium, selenium, silicon, germanium, iron, manganese, nickel, zinc, tin and palladium is contained in the micropores of the microporous aluminum oxide layer.

2. An electromagnetic wave energy absorbing material as defined in claim 1, wherein the aluminum material is an aluminum simple substance.

3. An electromagnetic wave energy absorbing material as defined in claim 1, wherein the aluminum material is an aluminum alloy.

4. An electromagnetic wave energy absorbing material as defined in claims 1, 2 or 3, wherein the thickness of the microporous aluminum oxide layer of the aluminum material is in a range of 0.1–0.9 micron.

* * * * *